United States Patent
Zhu et al.

(10) Patent No.: US 12,152,893 B2
(45) Date of Patent: Nov. 26, 2024

(54) TRAFFIC-INFO-INCORPORATED NNT DRIVER MODEL FOR EV TRIP ENERGY PREDICTION

(71) Applicant: GM GLOBAL TECHNOLOGY OPERATIONS LLC, Detroit, MI (US)

(72) Inventors: Yongjie Zhu, Troy, MI (US); Dongxu Li, Troy, MI (US); Yue-Yun Wang, Troy, MI (US); Chen-Fang Chang, Bloomfield Hills, MI (US); Chunhao J. Lee, Troy, MI (US); Brandon D. Mazzara, Grosse Pointe Shores, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 339 days.

(21) Appl. No.: 17/700,996

(22) Filed: Mar. 22, 2022

(65) Prior Publication Data

US 2023/0304810 A1 Sep. 28, 2023

(51) Int. Cl.
*G01C 21/34* (2006.01)
*G08G 1/052* (2006.01)

(52) U.S. Cl.
CPC ......... *G01C 21/3469* (2013.01); *G08G 1/052* (2013.01)

(58) Field of Classification Search
CPC ............................. G01C 21/3469; G08G 1/052
See application file for complete search history.

(56) References Cited

U.S. PATENT DOCUMENTS

| | | | |
|---|---|---|---|
| 2003/0078707 A1* | 4/2003 | Shioda | B60L 50/16 903/917 |
| 2014/0278038 A1* | 9/2014 | Stankoulov | G06T 11/203 701/123 |
| 2015/0168172 A1* | 6/2015 | Roth | G01C 21/3679 701/123 |
| 2015/0356635 A1* | 12/2015 | Thurston | B60Q 9/00 705/306 |
| 2016/0061611 A1* | 3/2016 | Meyer | G01C 21/3469 701/1 |
| 2018/0293595 A1* | 10/2018 | McMaster | G01C 21/3626 |
| 2019/0071096 A1* | 3/2019 | Leon Ojeda | B60W 40/04 |
| 2020/0114926 A1* | 4/2020 | Liu | G06N 20/00 |
| 2023/0139003 A1* | 5/2023 | Bhasme | B60L 58/16 701/533 |

OTHER PUBLICATIONS

U.S. Appl. No. 17/562,171, filed Dec. 27, 2021, Wang et al.

* cited by examiner

*Primary Examiner* — Khoi H Tran
*Assistant Examiner* — Tristan J Greiner (57) ABSTRACT

A trip energy estimation system for a vehicle includes a traffic speed module configured to determine an average traffic speed along a projected route, a path information module configured to output path information indicating route features along the projected route, a perceived speed module configured to output a perceived vehicle speed along the projected route based on the average traffic speed and the path information, and a dynamic driving module configured to calculate and output a predicted driver speed based on the perceived vehicle speed and a feedback input indicative of the predicted driver speed. The dynamic driving module is configured to execute a machine learning algorithm to calculate the predicted driver speed.

16 Claims, 7 Drawing Sheets

TRAFFIC-INFO-INCORPORATED NNT DRIVER MODEL FOR EV TRIP ENERGY PREDICTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric vehicles, and more particularly to predicted energy usage between origin and destination.

An electric vehicle includes a battery pack and one or more motors that are powered by the battery pack for propulsion purposes. The battery pack provides power to various vehicle systems including a propulsion system, lighting systems, infotainment systems, air-conditioning systems, braking systems, steering systems, autonomous control systems, navigation systems, etc. The propulsion system may include the one or more motors for driving wheels of the vehicle.

SUMMARY

A trip energy estimation system for a vehicle includes a traffic speed module configured to determine an average traffic speed along a projected route, a path information module configured to output path information indicating route features along the projected route, a perceived speed module configured to output a perceived vehicle speed along the projected route based on the average traffic speed and the path information, and a dynamic driving module configured to calculate and output a predicted driver speed based on the perceived vehicle speed and a feedback input indicative of the predicted driver speed. The dynamic driving module is configured to execute a machine learning algorithm to calculate the predicted driver speed.

In other features, the trip energy estimation system is configured to calculate a total trip energy associated with the projected route based on the predicted driver speed.

In other features, the total trip energy is calculated in accordance with $E_{trip}=\int[Ma+(f_0+f_1v+f_2v^2)+Mg\sin(\theta)]vdt$, $E_{trip}$ is the total trip energy, M is vehicle mass, $f_0$ is a rolling resistance coefficient, $f_1$ is road friction, $f_2$ is air drag, v is the predicted driver speed as calculated by the dynamic driving module, a is one of mean acceleration and calculated acceleration from the predicted driver speed along the route, g is gravity, and $\theta$ is a grade of the road.

In other features, the machine learning algorithm corresponds to a dynamic function.

In other features, the machine learning algorithm corresponds to a nonlinear autoregressive network with exogenous inputs (NARX) network.

In other features, the machine learning algorithm corresponds to a layer recurrent neural network based on a history of vehicle speed.

In other features, the dynamic driving module is configured to calculate the predicted driver speed as a function of a neural network NNT in accordance with NNT(V(t−1), V(t−2), x(t), x(t−1),x(t−2)), V is vehicle speed, t is a sample time, and x corresponds to one or more other variable inputs.

In other features, the dynamic driving module is configured to calculate the predicted driver speed further based on at least one of grade information and turn information along the projected route.

In other features, the trip energy estimation system further includes a grade module configured to output the grade information based on a grade of a road along the projected route and a turn module configured to output the turn information based on turns along the projected route.

In other features, the trip energy estimation system further includes a distance module configured to calculate a distance travelled along the projected route based on the predicted driver speed.

In other features, each of the path information module and the traffic speed module receives the calculated distance.

In other features, the traffic speed module is configured to determine the average traffic speed along the projected route as a function of distance and the perceived speed module is configured to determine the perceived vehicle speed along the projected route as a function of time.

In other features, a vehicle includes the trip energy estimation system.

A method includes determining an average traffic speed along a projected route, generating path information indicating route features along the projected route, calculating a perceived vehicle speed along the projected route based on the average traffic speed and the path information, and, using a machine learning algorithm, calculating and outputting a predicted driver speed based on the perceived vehicle speed and a feedback input indicative of the predicted driver speed.

In other features, the method further includes calculating a total trip energy associated with the projected route based on the predicted driver speed.

In other features, the method further includes calculating the total trip energy in accordance with $E_{trip}=\int[Ma+(f_0+f_1v+f_2v^2)+Mg\sin(\theta)]vdt$, $E_{trip}$ is the total trip energy, M is vehicle mass, $f_0$ is a rolling resistance coefficient, $f_1$ is road friction, $f_2$ is air drag, v is the predicted driver speed as calculated by the dynamic driving module, a is one of mean acceleration and calculated acceleration from the predicted driver speed along the route, g is gravity, and $\theta$ is a grade of the road.

In other features, the machine learning algorithm corresponds to at least one of a neural network toolbox (NNT), a nonlinear autoregressive network with exogenous inputs (NARX) network, and a layer recurrent neural network based on a history of vehicle speed.

In other features, the method further includes calculating the predicted driver speed as a function of a neural network NNT in accordance with NNT(V(t−1), V(t−2), x(t), x(t−1), x(t−2)), V is vehicle speed, t is a sample time, and x corresponds to one or more other variable inputs.

In other features, the method further includes calculating the predicted driver speed further based on at least one of grade information and turn information along the projected route.

In other features, the method further includes determining the average traffic speed along a projected route as a function of distance and determining the perceived vehicle speed along the projected route as a function of time.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may be equipped with a trip energy prediction device for estimating the amount of energy for a vehicle to travel from a first location (or origin) to a second location (or destination). As an example, a trip energy prediction device may include a driver model that is used for navigation and charge planning of all drivers. The trip energy prediction values may be the same for all drivers. Such a device is inaccurate and can lead to 20% or greater prediction error due to different driving styles and changing traffic conditions. As a result, the device may indicate that the vehicle has enough remaining energy to make a non-stop trip and due to the predicted error may need to be charged along the route prior to reaching the destination.

Trip energy estimation systems and methods according to the present disclosure are configured to estimate total trip energy based on driver specific behavior and reaction to traffic conditions and features such as signal lamps, stop signs, traffic signals, turns and curves, etc. The examples set forth herein include dynamic driving models and energy estimation algorithms for accurately estimating total trip energy. The examples include a dynamic driving model (e.g., a neural network, such as a neural network toolbox (NNT), a NARX (nonlinear autoregressive network with exogenous inputs) network, or other type of machine-learning network) configured to predict vehicle speed specific to a given driver over a total trip.

Accordingly, the dynamic driving model learns and accounts for individual driver acceleration, deceleration, and speed habits relative to traffic conditions and road features. An output (e.g., predicted speed) of the dynamic driving model is used to predict energy usage of an individual driver for a given route, which allows for improved prediction of charging needs and/or whether a non-stop trip, without charging along the route, is possible. The energy usage for an individual driver may refer to energy usage when the individual driver is driving the vehicle directly and the vehicle is not being operated in a semi-autonomous driving mode, when the individual driver is driving the vehicle in a semi-autonomous driving mode, etc.

Figure 1:
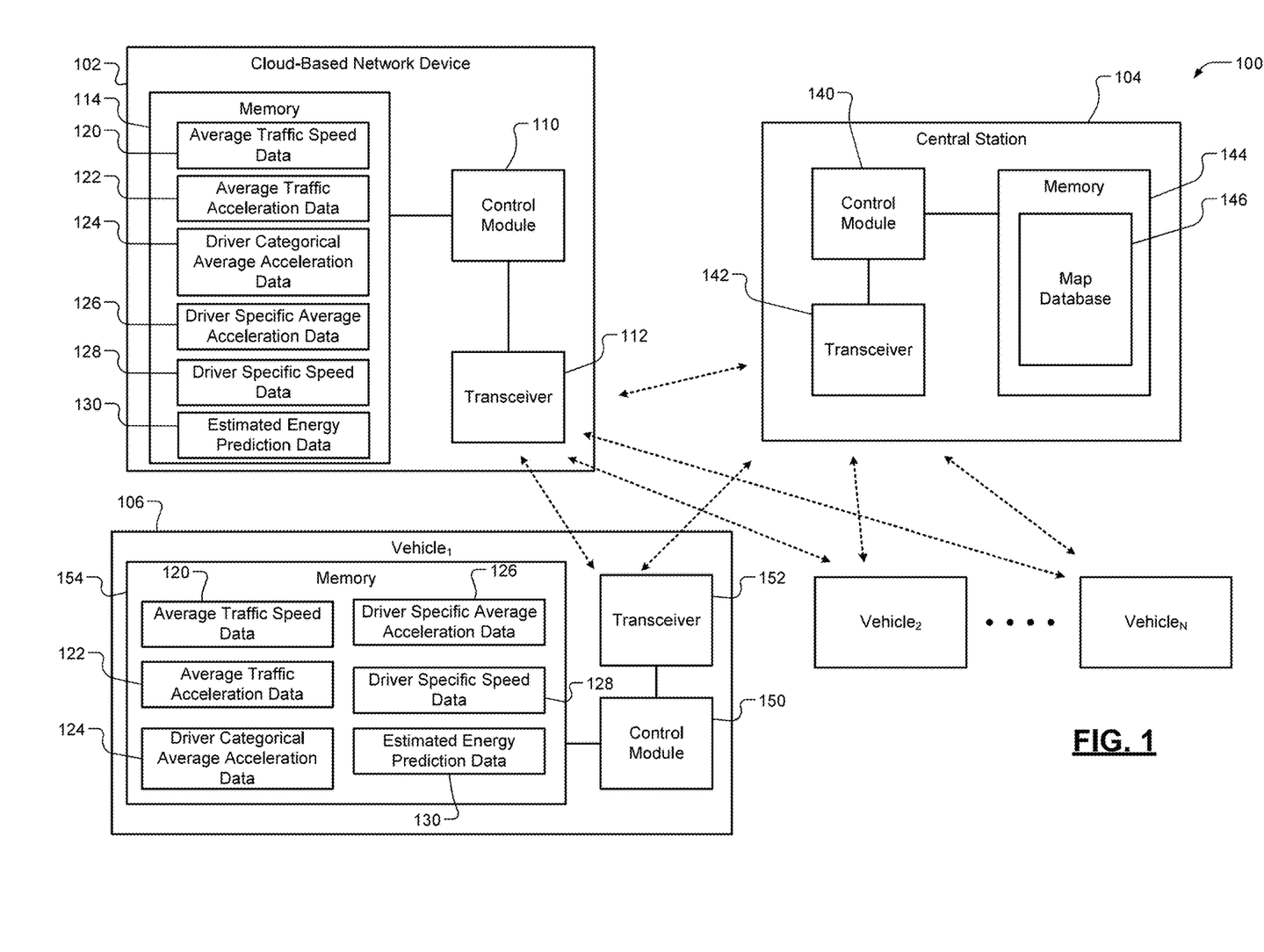
FIG. 1 is a functional block diagram of an example of a portion of a trip energy prediction system according to the present disclosure.
Figure 2:
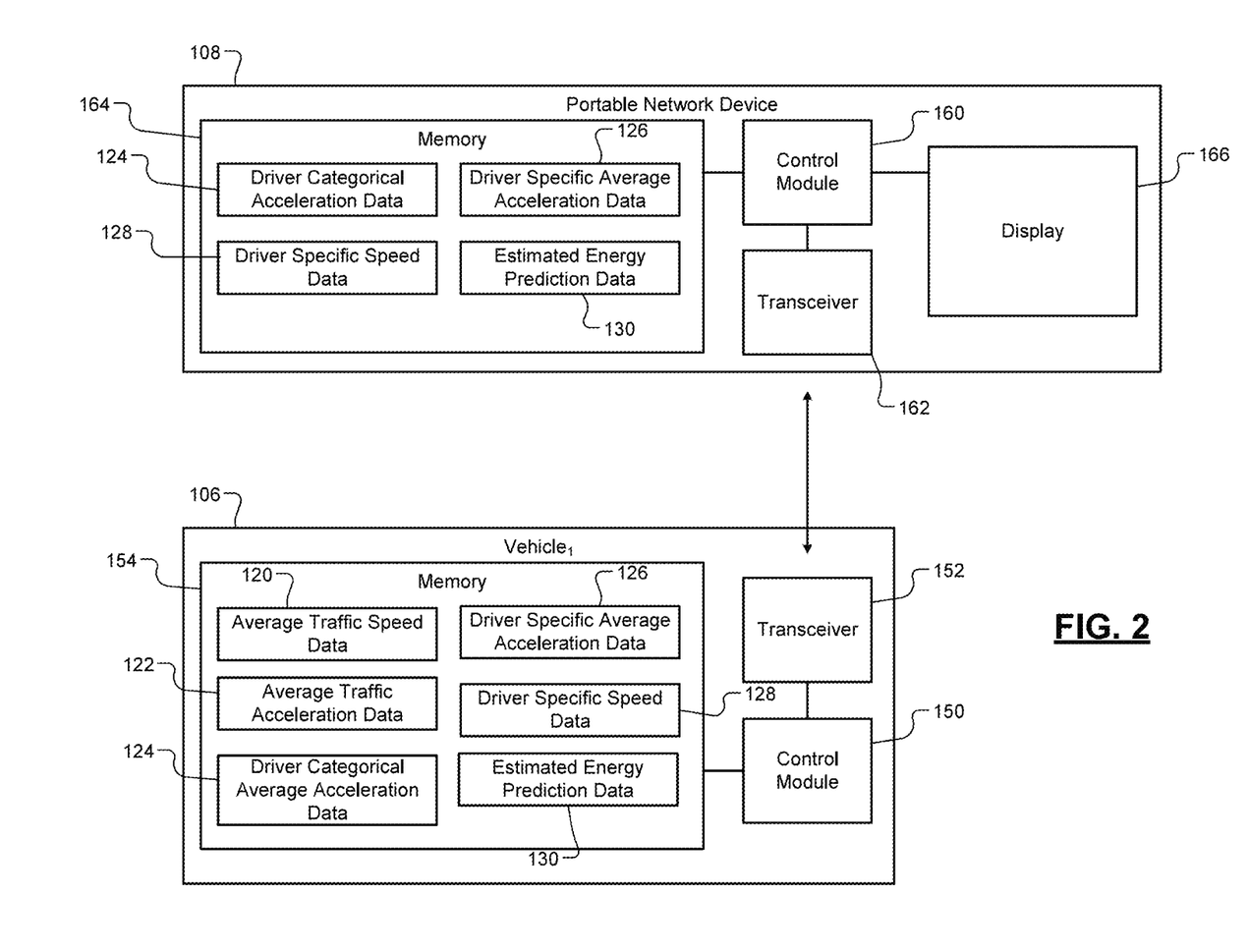
FIG. 2 is a function block diagram of an example of another portion of the trip energy prediction system of FIG. 1.

FIGS. 1-2 show a trip energy estimation system 100 according to the present disclosure. The trip energy estimation system 100 may include a cloud-based network device 102, a central station 104, a vehicle 106, and a portable network device 108. The cloud-based network device 102 may be implemented as a server of a cloud-based network and include a control module 110, a transceiver 112, and a memory 114. The memory 114 may store average traffic speed data 120, average traffic acceleration data 122, driver categorical average acceleration data 124, driver specific average acceleration data 126, driver specific speed data 128, and estimated energy prediction data 130. The data 120, 122, 124, 126, 128, 130 may be collected, determined, and/or stored at and/or shared with any of the cloud-based network device 102, the central station 104, the vehicle 106, and the portable network device 108. In an embodiment, the portable network device 108 stores the data 124, 126, 128, 130 and not the data 120, 122. The portable network device 108 may be a mobile phone, a wearable device, a tablet, a laptop computer, etc.

The central station 104 may include a control module 140, a transceiver 142, and memory 144 storing a map database 146. The map database 146 may store traffic information as well as path information. Traffic information may include levels of congestion at various locations, average traffic speeds for various locations and routes, average traffic acceleration for routes, and other traffic related information, such as weather conditions, locations of collisions, etc. Path information may include locations and types of traffic lights, locations and types of traffic signs, road curvature locations and road grades, etc.

The vehicle 106 may include a control module 150, a transceiver 152, and a memory 154. The memory 154 may store the data 120, 122, 124, 126, 128, and 130. Multiple vehicles$_{1-N}$ are shown, where vehicles$_{2-N}$ may be configured and operate similarly as vehicle 106. The transceiver 152 may be in communication with the transceivers 112, 142. The portable network device may include a control module 160, a transceiver 162, a memory 164 and a display 166 (e.g., a touchscreen).

Figure 3:
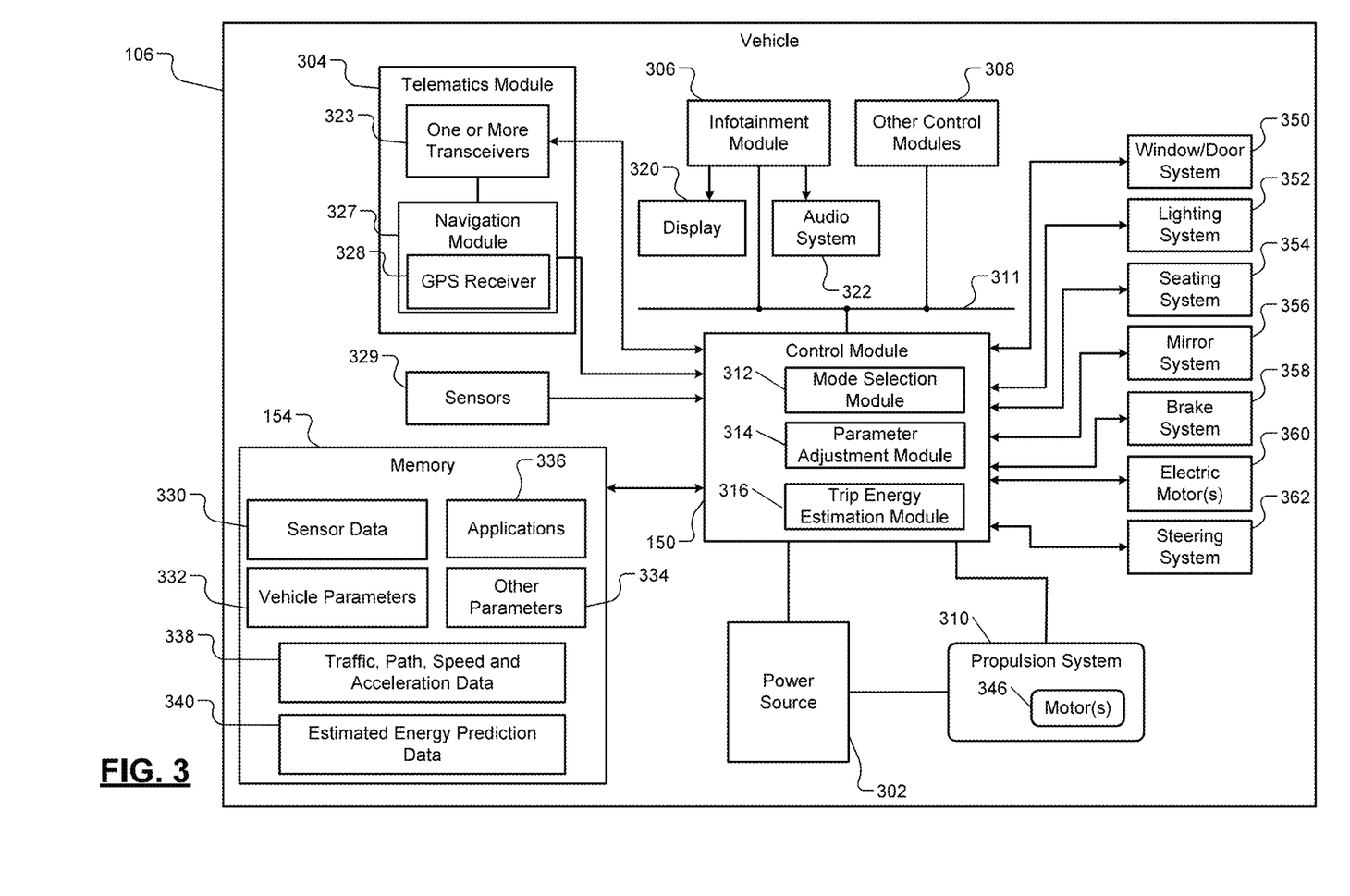
FIG. 3 is a functional block diagram of an example of a vehicle including a trip energy estimation module according to the present disclosure.

FIG. 3 shows the vehicle 106 that includes the control module 150, a power source 302, a telematics module 304, an infotainment module 306, other control modules 308, and a propulsion system 310. The control module 150 may control operation of the vehicle 106 and the modules 304, 306, 308 and the propulsion system 310. The power source 302 may include one or more battery packs, a generator, a converter, a control circuit, terminals for high and low voltage loads, etc.

The telematics module 304 provides wireless communication services within the vehicle 106 and wirelessly communicates with service providers. The telematics module 304 may support Wi-Fi®, Bluetooth®, Bluetooth Low Energy (BLE), near-field communication (NFC), cellular, legacy (LG) transmission control protocol (TCP), long-term evolution (LTE), and/or other wireless communication and/or operate according to Wi-Fi®, Bluetooth®, BLE, NFC, cellular, and/or other wireless communication protocols. The telematics module 304 may include one or more transceivers 323 and a navigation module 327 with a global positioning system (GPS) 328. The transceivers 323 wirelessly communicate with network devices internal and external to the vehicle 106 including the cloud-based network device 102, the central station 104 and the portable network device 108 of FIGS. 1-2. The transceivers 323 may perform pattern recognition, channel addressing, channel access control, and filtering operations.

The navigation module 327 executes a navigation application to provide navigation services. The navigation services may include location identification services to identify where the vehicle 106 is located. The navigation services may also include guiding a driver and/or directing the vehicle 106 to a selected location. The navigation module 327 may communicate with the central station 104 to collect traffic map information indicating traffic and path information. As an example, if the vehicle 106 is an autonomous vehicle, the navigation module 327 may direct the control module 150 along a selected route to a selected destination. The GPS receiver 328 may provide vehicle velocity and/or direction (or heading) of the vehicle and/or global clock timing information.

The infotainment module 306 may include and/or be connected to an audio system 322 and/or a video system including one or more displays (one display 320 is shown) to provide trip energy information, vehicle status information, diagnostic information, prognostic information, entertainment features, etc. The infotainment module 306 may be used to guide a vehicle operator to a certain location, indicate trip energy estimations and other related trip energy information. The other related trip energy information may include whether a non-stop trip may be taken with a remaining amount of stored energy in the power source 302 and/or an available amount of stored energy (percentage of total remaining energy) permitted to be utilized for propulsion purposes. The propulsion system 310 may include one or more electric motors 346 to propel the vehicle 106.

The modules 150, 304, 306, 308 may communicate with each other via one or more buses 311, such as a controller area network (CAN) bus and/or other suitable interfaces. The control module 150 may control operation of vehicle modules, devices and systems based on feedback from sensors 329. The sensors 329 may include sensors, cameras, objection detection sensors, temperature sensors, accelerometers, a vehicle velocity sensor, and/or other sensors.

The control module 150 may include a mode selection module 312, a parameter adjustment module 314, and a trip energy estimation module 316. The mode selection module 312 may select a vehicle operating mode. The parameter adjustment module 314 may be used to adjust parameters of the vehicle 106. The trip energy estimation module 316 may estimate trip energy for the vehicle 106 to travel between locations, which may be driver categorical based and/or driver specific, as further described below. The categories may include aggressive, normal and economical driving categories, which may have associated vehicle speeds, average vehicle speeds, accelerations, and/or average accelerations for certain driving routes, time of day, traffic conditions, etc. For example only, the trip energy estimation module 316 may implement the dynamic driving model according to the present disclosure.

The vehicle 106 may further include the memory 154. The memory 154 may store sensor data 330 and/or vehicle parameters 332, other parameters 334 (e.g., battery pack state of charge or remaining energy), and applications 336 (e.g., a trip energy estimation application). The applications 336 may include applications executed by the modules 150, 304, 306, 308. Although the memory 154 and the control module 150 are shown as separate devices, the memory 154 and the control module 150 may be implemented as a single device. The memory 154 may also store traffic, path, speed and acceleration data 338 such as that referred to herein and estimated energy prediction data 340 such as that referred to herein.

The control module 150 may control operation of a window/door system 350, a lighting system 352, a seating system 354, a mirror system 356, a brake system 358, electric motors 360 and/or a steering system 362 according to parameters set by the modules 150, 304, 306, 308.

The control module 150 may set some of the parameters based on signals received from the sensors 329. The control module 150 may receive power from the power source 302, which may be provided to the propulsion system 310, the window/door system 350, the lighting system 352, the seating system 354, the mirror system 356, the brake system 358, the electric motors 360 and/or the steering system 362, etc. Some of the vehicle control operations may include unlocking doors of the window/door system 350, starting the electric motors 360, powering any of the modules 304, 306, 308, 327 and the systems 322, 350, 352, 354, 356, 358, 362, and/or performing other operations as are further described herein.

Power supplied to the motors 346, window/door system 350, the lighting system 352, the seating system 354, the mirror system 356, the brake system 358, the electric motors 360 and/or the steering system 362 and/or actuators thereof may be controlled by the control module 150 to, for example, adjust: motor speed, torque, and/or acceleration; braking pressure; steering wheel angle; pedal position; door locks and window positions; seat angles; etc. This control may be based on the outputs of the sensors 329, the navigation module 327, the GPS receiver 328 and the data and information stored in the memory 154.

The control module 150 may determine various parameters including a vehicle speed, a motor speed, a gear state, an accelerator position, a brake pedal position, an amount of regenerative (charge) power, an amount of auto start/stop discharge power, and/or other information. The other information may include priority levels of loads on the power source 302, power, current and voltage demands for each source terminal, etc. The control module 150 may share this information and the vehicle operating mode with the power source 302.

The power source 302 and/or a control circuit thereof may determine other parameters, such as: an amount of charge power at each source terminal; an amount of discharge power at each source terminal; maximum and minimum voltages at source terminals; maximum and minimum voltages at power rails, cells, blocks, packs, and/or groups; SOX values of cells, blocks, packs, and/or groups; temperatures of cells, blocks, packs, and/or groups; current values of cells, blocks, packs, and/or groups; power values cells, blocks, packs, and/or groups; etc. The acronym "SOX" refers to a state of charge (SOC), a state of health (SOH), state of power (SOP), and/or a state of function (SOF). Power, voltage and/or current sensors may be included separate from and/or in the power source 302 for SOX determinations. The SOC of a cell, pack and/or group may refer to the voltage, current and/or amount of available power stored in the cell, pack and/or group. The SOH of a cell, pack and/or group may refer to: the age (or operating hours); whether there is a short circuit; whether there is a loose wire or bad connection; temperatures, voltages, power levels, and/or current levels supplied to or sourced from the cell, pack and/or group during certain operating conditions; and/or other parameters describing the health of the cell, pack and/or group.

The SOF of a cell, pack and/or group may refer to a current temperature, voltage, and/or current level supplied to or sourced from the cell, pack and/or group, and/or other parameters describing a current functional state of the cell, pack and/or group. The power source 302 may determine connected configurations of the cells and corresponding switch states as described herein based on the parameters determined by the control module 150 and/or the control circuit (or module) of the power source 302.

The following examples and/or portions thereof may be implemented by one or more of the control modules 110, 140, 150, 160 and the trip energy estimation module 316 of FIGS. 1-3. Although FIGS. 1-3 show the control module 150 of the vehicle including the trip energy estimation module 316, the control modules 110, 140, and 160 may implement a same or similar module. The trip energy estimation module 316 may be implemented in the navigation module 327 and share any collected and/or determined information with the control module 150.

The trip energy estimation module 316 may determine, track, and/or learn each driver's acceleration style and speed style. This may be performed for each driver and each vehicle. The acceleration style refers to typical acceleration rates and deceleration rates of a driver. The speed style refers to whether a driver typically drives over authorized traffic speed limits, at the traffic speed limits, or under the traffic speed limits including how much over and how much under the traffic speed limits. The trip energy estimation module 316 may implement machine learning algorithms to track and update this information for each driver of each vehicle of concern. The machine learning algorithms may be used to characterize each driver's driving style. This characterization may be route based and/or time of day based. Route traffic and path information may be projected onto average traffic speed plots to determine where stop and go events occur to account for the energy used during each of the stop and go events. This is further described below.

The trip energy estimation module 316 implements a dynamic driving model formulated as functions of learned driving styles with the associated traffic and path information. The dynamic driving models are used to calculate dynamic energy usage of individual drivers. Trip energy for an electric vehicle to travel from a first location to a second location is predicted based on the dynamic energy usage as described below in more detail.

Figure 4:
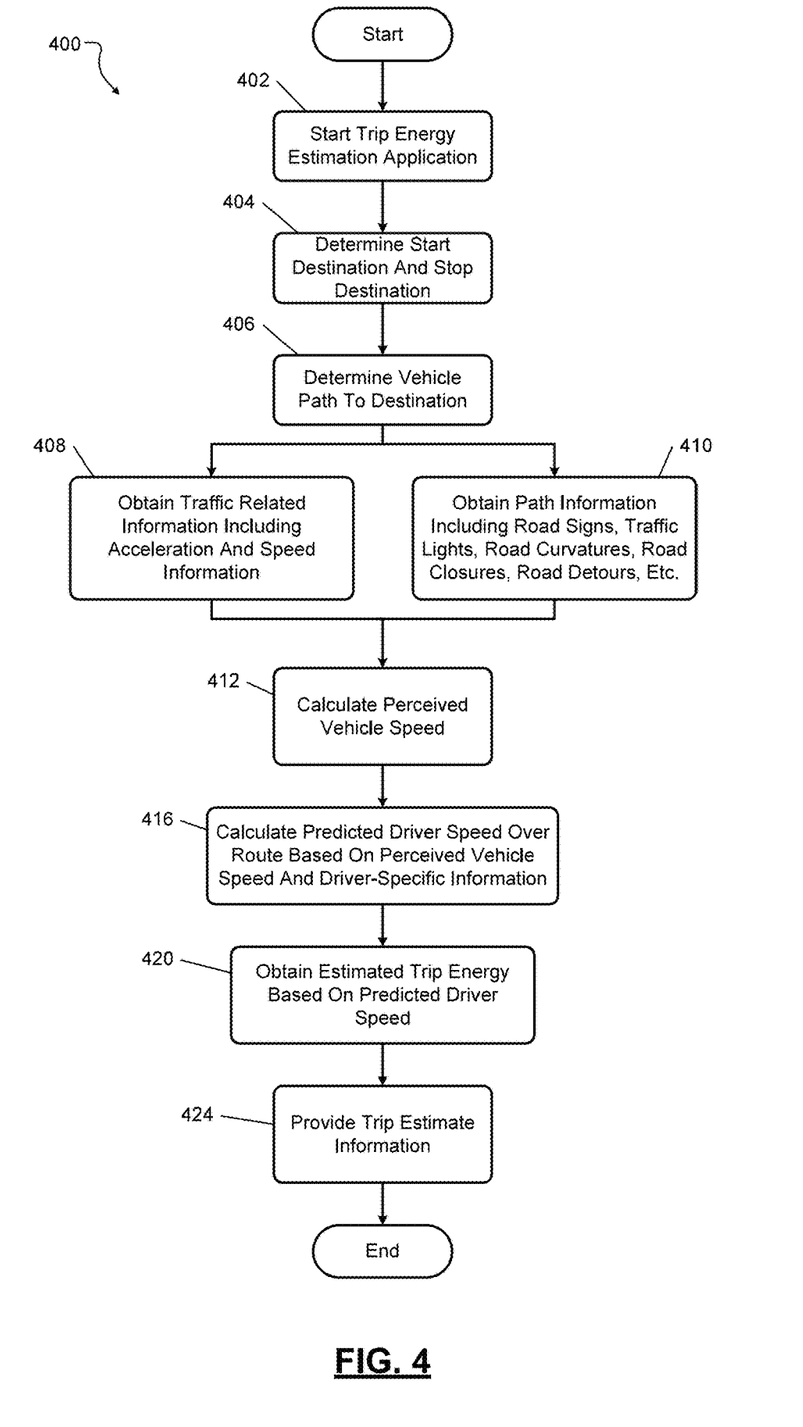
FIG. 4 illustrates an example of a method for estimating trip energy for a particular driver according to the present disclosure.

FIG. 4 shows a method 400 of estimating trip energy for a particular driver. The operations may be iteratively performed. The operations may be performed by the above-described trip energy estimation module 316. In one embodiment, one or more operations are performed by one of the trip energy estimation modules 316 and the results thereof are shared with one or more other trip energy estimation modules 316.

At 402, a trip energy estimation application may be started. This may include, for example, a driver selecting the application on the display 320 of FIG. 3, on another display of the vehicle 106, on the display 166 of the portable network device 108, etc. This may include providing inputs to, for example, the navigation module 327.

At 404, start and stop destinations are determined for a trip. This may include receiving inputs from a driver indicating that the trip is to start, for example, where the vehicle is currently located (referred to as Point A), and providing the stop destination (referred to as point B).

At 406, the navigation module 327 of the vehicle, one of the trip energy estimation modules, and/or the control module 160 of the portable network device 108 may determine one or more paths to travel from Point A to Point B. The navigation module 327 of the vehicle, the trip energy estimation module 316, the control module 160, or the driver may select one of the possible paths. As an example, the path having the shortest drive time, least amount of traffic, and/or least amount of energy may be selected.

In one embodiment, the path may be adjusted or reselected after performing operations 408, 410, 412, 416, 420, and 424 and based on predicted energy usage determined for each possible path. The path that requires the least amount of energy usage may be selected. This selection may be performed by one of the stated modules. The control module 160 may then, if the vehicle 106 is a partially or fully autonomous vehicle, assist, direct, and/or cause the vehicle to driver from Point A to Point B.

Figure 5A:
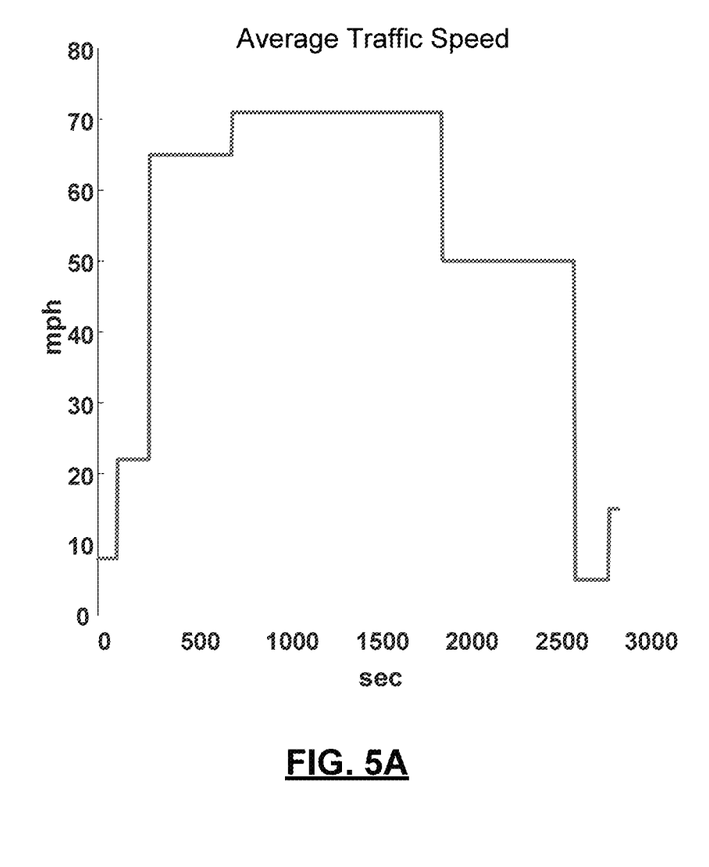
FIG. 5A is an example plot of average traffic speed along a route.

At 408, traffic related information including acceleration and speed information may be collected (e.g., from a third party or other external traffic information source, such as a traffic or navigation system or app). This may include average traffic speeds and acceleration data for the one or more paths. This may also include actual vehicle speeds and acceleration for the driver while traveling along the one or more paths. This information may be collected at the vehicle 106 and/or the portable network device 108 and may be received from the cloud-based network device. This may include the data 120, 122, 126, 128. FIG. 5A shows an example plot of average traffic speed along a route.

At 410, path related information including locations and types of road signs, locations of stop signs, locations, and types of signal lights, locations of traffic congestion, locations and types of road curvatures, locations of road closures, locations of road detours, etc. is obtained. The path information may be collected at the vehicle 106 and/or the portable network device 108 and may be received from the central station 104, where the information may be stored in the map database 146.

Figure 5B:
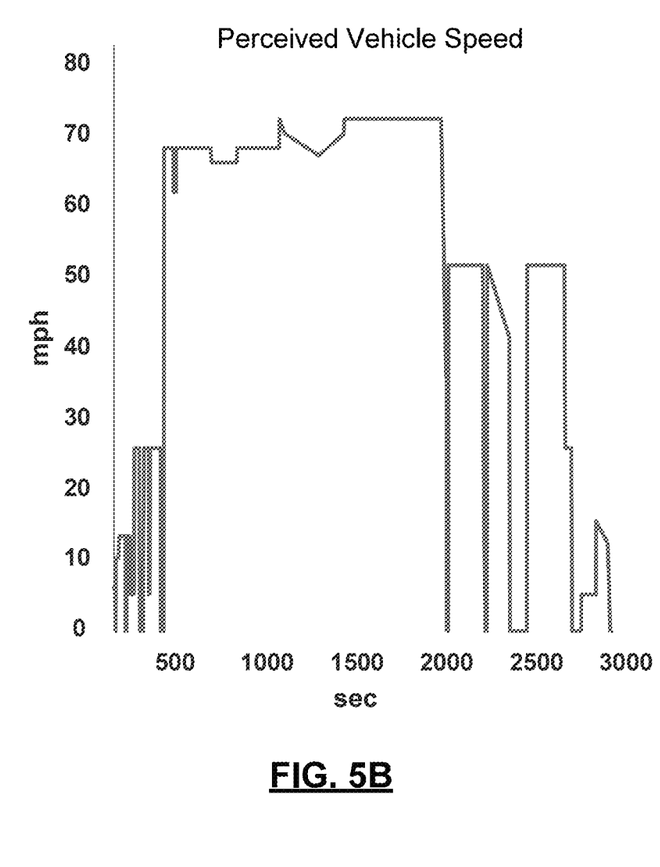
FIG. 5B is an example plot of perceived vehicle speed along a route.

At 412, a perceived vehicle speed is calculated based on the average traffic speed information and the path related information. FIG. 5B shows an example plot of perceived vehicle speed along the same route as shown in FIG. 5A. The perceived vehicle speed correlates the average traffic speed to objects, conditions, and/or road changes that cause stop and go events. In other words, the method 400 adjusts the average traffic speed to account for stop, go, and deceleration events) over the route to calculate the perceived vehicle speed. In some examples, the perceived vehicle speed corresponds to a perceived speed limit.

Figure 5C:
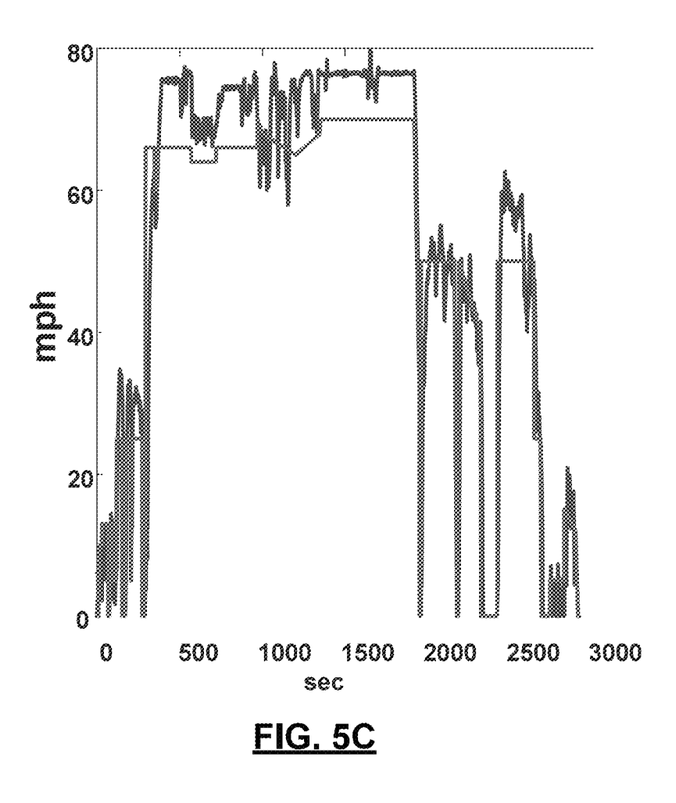
FIG. 5C is an example plot of actual driver speed along a route.

At 416, a predicted driver speed over the route is calculated based on the perceived vehicle speed and driver-specific information. FIG. 5C shows an example plot of an actual driver speed over the route relative to the perceived vehicle speed over the same route. Actual driver speed (i.e., fora given driver) is not identical to the perceived vehicle speed or the average traffic speed. Rather, the actual driver speed varies based on driving habits, reaction and behavior in view of various traffic and road features, etc. Accordingly, driver behavior for a specific driver (i.e., driver-specific information) is monitored over time and a dynamic driving model is trained according to the present disclosure to calculate or predict the driver speed that matches with the actual driving speed using the driver-specific information. Once the dynamic driving model is well-trained with sufficient data, this dynamic model can be applied to predict trip energy for any given path as described below in more detail. In this manner, the predicted driver speed more accurately reflects the actual driver speed and an estimated trip energy is more accurate.

At 420, an estimated trip energy for the route is obtained based on the predicted driver speed. The estimated trip energy may be based on a travel distance between start (or beginning) and stop (or end) destinations, travel durations, traffic average speed, and traffic average acceleration. The trip energy $E_{trip}$ may be determined according to Equation 1, where M is vehicle mass, $f_0$ is a rolling resistance coefficient, $f_1$ is road friction, $f_2$ is air drag, v is predicted driver speed (e.g., as calculated by the dynamic driving model), a is the learned driver's average acceleration or acceleration calculated directly from the predicted driver speed v along the route, g is gravity, and B is the road grade (i.e. angle of inclination or declination). The energy $E_{trip}$ may be based on the travel duration and/or travel distance.

$$E_{trip} = \int [Ma + (f_0 + f_1 v + f_2 v^2) + Mg \sin(\theta)] v \, dt \quad (1)$$

The predicted driver speed is calculated by the dynamic driving module in accordance with Equation 2. In other words, the predicted driver speed is a function NNT of the predicted vehicle speeds at previous sample time and other inputs at current and previous sample times over the entirety of a route.

$$V(t) = NNT(V(t-1), V(t-2), x(t), x(t-1), x(t-2)) \quad (2)$$

The function NNT is calculated using, for example, a neural network (e.g., a layer recurrent neural network) as described below in more detail. A layer recurrent neural network uses, as inputs, a history of vehicle velocity as determined at respective times t (V(t−1), V(t−2), etc.) and other input vectors x at the respective times (x(t), x(t−1), x(t−2), etc.). The other input vectors x include, but are not limited to, perceived vehicle speed, turn and grade information, etc.

Acceleration associated with the driver driving the vehicle 106 from start and stop destinations along the one or more paths is obtained and/or determined using various methods. For example, this data may be retrieved from memory based on the driver's acceleration style learned from previous driving data. The acceleration data may be average acceleration data associated with the driver previously driving along the one or more paths and/or associated with the driving along one or more other paths. The trip energy estimation module 316 may continuously monitor, track and store vehicle speed and acceleration data of the driver and perform statistical learning of these parameters for current and subsequent use in estimating the acceleration data and/or averages associated with the driver. As an example, statistical learning of the driver's acceleration may be performed based on vehicle speed versus time plots. An example of statistical learning of acceleration is described in more detail in U.S. patent application Ser. No. 17/562,171, filed on Dec. 27, 2021, the entire contents of which are incorporated herein.

As described above, the energy calculated in accordance with the predicted driver speed accounts for (i) different acceleration driving style of the driver, (ii) stop and go events experienced by the driver while traveling along the route, and (iii) over speeding and/or under speeding of the driver. At 424, the vehicle 106 (e.g., one or more of the control module 150, telematics module 304, infotainment module 306, other modules 308, etc.) may perform various functions based on the calculated energy.

For example, trip estimate information (e.g., an indication of a trip estimate) may be provided. For example, the information may indicate remaining energy (e.g., in mileage), whether the remaining energy will support a non-stop trip or whether one or more charging stops will be needed based on the total trip energy and the remaining energy, etc. The indication may be provided to the vehicle operator via, for example, the display 320. Other trip estimates may include indications of when charging will be needed and distances that can be traveled on current state of charge based on the driver's driving style. As stated above, a path may be selected and followed based on the estimated trip energy for that path and/or various other operations may be performed based on the total trip energy and the remaining energy.

In other examples, the vehicle 106 may perform other functions based on the calculated energy including, but not limited to, adjusting driving behavior (e.g., switching between driving modes that provide different levels of performance using more or less energy), adjusting navigation parameters (e.g., switching between routes that may use more or less energy), adjusting charging behavior, etc.

Figure 6:
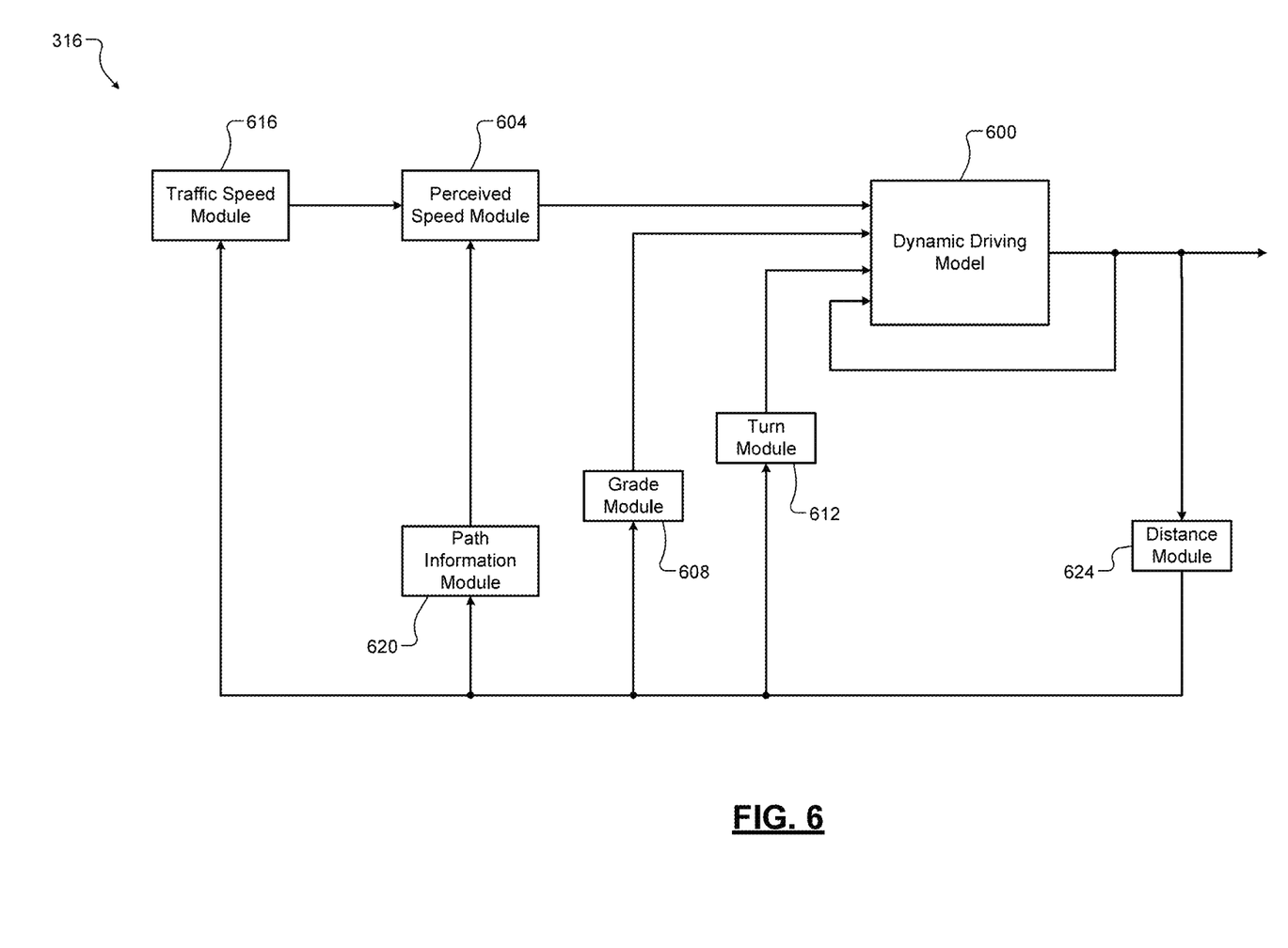
FIG. 6 is an example trip energy estimation module implementing a dynamic driving model according to the present disclosure.

An example of the trip energy estimation module 316 implementing a dynamic driving module 600 in a closed-loop control scheme according to the present disclosure is shown in FIG. 6. For example, dynamic driving module 600 is configured as a neural network, such as a NARX (non-linear autoregressive network with exogenous inputs) network, a layer recurrent neural network, or other type of machine-learning network configured to predict vehicle speed specific to a given driver over a total trip (i.e., using a dynamic driving model as described above). The dynamic driving module 600 learns and accounts for individual driver acceleration, deceleration, and speed habits relative to traffic conditions and road features. An output (e.g., predicted speed) of the dynamic driving module 600 is used to predict energy usage of an individual driver for a given route, which allows for improved prediction of charging needs.

The dynamic driving module 600 receives inputs including, but not limited to, a perceived vehicle speed (e.g., from a perceived speed module 604), a grade information input (e.g., from a grade module 608), a turn information input (e.g., from a turn module 612), and, as a closed-loop feedback input, a previously predicted driver speed output of the dynamic driving module 600. For example, the dynamic driving module 600 calculates and outputs the predicted driver speed in accordance with Equation 2 as described above, which corresponds to an adaptive, personalized driver model that is adapted over time. In other words, the dynamic driving model is implemented as a personalized driver module that adapts to driver behavior over time, such as a machine learning network or algorithm (e.g., an NNT-trained machine learning algorithm). The output of the dynamic driving module 600 may further include other values indicative of energy used by the vehicle, such as axle torque and axle power.

The perceived speed module 604 receives an average traffic speed from a traffic speed module 616 and path information from a path information module 620. For example, the traffic speed module 616 collects traffic related information including acceleration and speed information (e.g., from a third party or other external traffic information source, such as a traffic or navigation system or app). The output of the traffic speed module 616 corresponds to a distance-based traffic speed along a projected route of the vehicle. In other words, the output of the traffic speed module 616 corresponds to a speed of the vehicle as a function of a distance travelled along the projected route.

As one example, the traffic speed module 616 receives route information and a predicted driving distance for the projected route. For example, a distance module 624 calculates the predicted driving distance based on the predicted speed (e.g., as an integral of speed). Each of the grade module 608, the turn module 612, the traffic speed module 616, and the path information module 620 receives the predicted driving distance. Accordingly, the traffic speed module 616 outputs an average traffic speed as a function of distance travelled along a projected route. The grade module 608 and the turn module 612 output grade and turn information as a function of time, based on the distance travelled along a projected route in view of turns and road grade along the projected route.

Similarly, the path information module 620 outputs path information as a function of distance with respect to the projected route. The path information includes route features such as locations and types of road signs, locations of stop signs, locations, and types of signal lights, locations of traffic congestion, locations and types of road curvatures, locations of road closures, locations of road detours, etc. Accordingly, the path information indicates the locations of the various route features along the projected route.

The perceived speed module 604 calculates and outputs the perceived vehicle speed based on the average traffic speed and the path information (e.g., as described above in FIG. 4). As an example, the perceived speed module 604 calculates the perceived vehicle speed as a function of time (e.g., a function of time relative to the projected route). In other words, the perceived speed module 604 translates the distance-based average traffic speed output by the traffic speed module 616 to the time-based perceived vehicle speed.

In this manner, the dynamic driving module 600 calculates the predicted driver speed using the time-based perceived vehicle speed, grade information, turn information, and a feedback input as inputs (e.g., inputs to an NNT). An overall trip energy for the projected route can then be calculated using the predicted driver speed (e.g., using the trip energy estimation module 316 in accordance with Equation 1).

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation and/or sequence of events. This information may be indicated on one or more of the above-stated displays.

As described herein, the principles of the present disclosure address accurate trip energy prediction fort vehicles and claimed embodiments include trip energy estimation systems and/or methods configured to specifically address improved accuracy for trip energy prediction for vehicles. Accordingly, the claimed embodiments provide an improvement in the technical field of trip energy prediction for vehicles.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A trip energy estimation system for a vehicle, the trip energy estimation system comprising:
    a traffic speed module configured to determine an average traffic speed along a projected route;
    a path information module configured to output path information indicating route features along the projected route;
    a perceived speed module configured to output a perceived vehicle speed along the projected route based on the average traffic speed and the path information;
    a dynamic driving module configured to calculate and output a predicted driver speed based on the perceived vehicle speed and a feedback input indicative of the predicted driver speed, wherein the dynamic driving module is configured to execute a machine learning algorithm to calculate the predicted driver speed;
    a trip energy estimation module configured to calculate a total trip energy associated with the projected route based on the predicted driver speed,
    wherein trip energy estimation module is configured to calculate the total trip energy in accordance with $E_{trip} = \int [Ma + (f_0 + f_1 v + f_2 v^2) + Mg\sin(\theta)] \, v \, dt$, wherein $E_{trip}$ is the total trip energy, M is vehicle mass, $f_0$ is a rolling resistance coefficient, $f_1$ is road friction, $f_2$ is air drag, v is the predicted driver speed as calculated by the dynamic driving module, a is one of mean acceleration and calculated acceleration from the predicted driver speed along the route, g is gravity, and $\theta$ is a grade of the road; and
    a control module configured to autonomously drive the vehicle along the projected route based on the total trip energy,
    wherein the trip energy estimation module is configured to statistically learn the acceleration based on vehicle speed versus time plots.

2. The trip energy estimation system of claim 1, wherein the machine learning algorithm corresponds to a dynamic function.

3. The trip energy estimation system of claim 1, wherein the machine learning algorithm corresponds to a nonlinear autoregressive network with exogenous inputs (NARX) network.

4. The trip energy estimation system of claim 1, wherein the machine learning algorithm corresponds to a layer recurrent neural network which is based on a history of vehicle speed.

5. The trip energy estimation system of claim 1, wherein the dynamic driving module is configured to calculate the predicted driver speed as a function of a neural network NNT in accordance with NNT(V(t−1), V(t−2), x(t), x(t−1), x(t−2)), wherein V is vehicle speed, t is a sample time, and x corresponds to one or more other variable inputs.

6. The trip energy estimation system of claim 1, wherein the dynamic driving module is configured to calculate the predicted driver speed further based on at least one of grade information and turn information along the projected route.

7. The trip energy estimation system of claim 6, wherein further comprising:
    a grade module configured to output the grade information based on the grade of a road along the projected route; and
    a turn module configured to output the turn information based on turns along the projected route.

8. The trip energy estimation system of claim 1, further comprising a distance module configured to calculate a distance travelled along the projected route based on the predicted driver speed.

9. The trip energy estimation system of claim 8, wherein each of the path information module and the traffic speed module receives the calculated distance.

10. The trip energy estimation system of claim 1, wherein the traffic (Original) speed module is configured to determine the average traffic speed along the projected route as a function of distance and the perceived speed module is configured to determine the perceived vehicle speed along the projected route as a function of time.

11. A vehicle comprising the trip energy estimation system of claim 1.

12. A method, comprising:

determining an average traffic speed along a projected route;

generating path information indicating route features along the projected route;

calculating a perceived vehicle speed along the projected route based on the average traffic speed and the path information;

using a machine learning algorithm, calculating and outputting a predicted driver speed based on the perceived vehicle speed and a feedback input indicative of the predicted driver speed;

a calculating a total trip energy associated with the projected route based on the predicted driver speed in accordance with $E_{trip} = \int [Ma + (f_0 + f_1 v + f_2 v^2) + Mg\sin(\theta)] v \, dt$, wherein $E_{trip}$ is the total trip energy, M is vehicle mass, $f_0$ is a rolling resistance coefficient, $f_1$ is road friction, $f_2$ is air drag, v is the predicted driver speed as calculated by the dynamic driving module, a is one of mean acceleration and calculated acceleration from the predicted driver speed along the route, g is gravity, and $\theta$ is a grade of the road;

autonomously driving the vehicle along the projected route based on the total trip energy; and statistically learning the acceleration based on vehicle speed versus time plots.

13. The method of claim 12, wherein the machine learning algorithm corresponds to at least one of a neural network toolbox (NNT), a nonlinear autoregressive network with exogenous inputs (NARX) network, and a layer recurrent neural network which is based on a history of vehicle speed.

14. The method of claim 12, further comprising calculating the predicted driver speed as a function of a neural network NNT in accordance with NNT (V(t−1), V(t−2), x(t), x(t−1), x(t−2)), wherein V is vehicle speed, t is a sample time, and x corresponds to one or more other variable inputs.

15. The method of claim 12, further comprising calculating the predicted driver speed further based on at least one of grade information and turn information along the projected route.

16. The method of claim 12, further comprising determining the average traffic speed along a projected route as a function of distance and determining the perceived vehicle speed along the projected route as a function of time.

* * * * *